US010814992B2

(12) United States Patent
Halsey et al.

(10) Patent No.: US 10,814,992 B2
(45) Date of Patent: Oct. 27, 2020

(54) POWER SOURCE FOR AN AIRCRAFT

(71) Applicant: GE Aviation Systems Limited, Cheltenham (GB)

(72) Inventors: Colin John Halsey, Tewkesbury (GB); Michael David Bailey, Tewkesbury (GB)

(73) Assignee: GE Aviation Systems Limited, Cheltenham (GB)

( * ) Notice: Subject to any disclaimer, the term of this patent is extended or adjusted under 35 U.S.C. 154(b) by 320 days.

(21) Appl. No.: 15/814,655

(22) Filed: Nov. 16, 2017

(65) Prior Publication Data

US 2018/0134401 A1  May 17, 2018

(30) Foreign Application Priority Data

Nov. 16, 2016 (GB) .................................. 1619401.1

(51) Int. Cl.
*B64D 27/24* (2006.01)
*B64D 41/00* (2006.01)
*B64C 13/36* (2006.01)

(52) U.S. Cl.
CPC .............. *B64D 27/24* (2013.01); *B64C 13/36* (2013.01); *B64D 2041/005* (2013.01); *H01M 2250/20* (2013.01); *Y02T 50/64* (2013.01); *Y02T 90/32* (2013.01); *Y02T 90/36* (2013.01)

(58) Field of Classification Search
CPC .............. B64D 2027/026; B64D 27/24; B64D 2041/005; H01M 2250/20; H01M 2250/40
See application file for complete search history.

(56) References Cited

U.S. PATENT DOCUMENTS

| 6,641,084 | B1 | 11/2003 | Huber et al. |
| 7,659,015 | B2* | 2/2010 | Hoffjann ............ H01M 8/04014 429/411 |
| 8,137,854 | B2 | 3/2012 | Gans |
| 8,727,270 | B2 | 5/2014 | Burns et al. |
| 9,966,619 | B2* | 5/2018 | Libis ................. H01M 8/04955 |
| 2004/0043276 | A1* | 3/2004 | Hoffjann ................ B01D 53/02 429/411 |

(Continued)

FOREIGN PATENT DOCUMENTS

| CN | 104386071 A | * | 3/2015 |
| CN | 104386071 A | | 3/2015 |
| GB | 2 452 217 A | | 2/2009 |

OTHER PUBLICATIONS

Halsey, C.J., et al., Auxiliary power unit with solid oxide fuel cell for an aircraft, GE co-pending Application No. 1619403.7, filed on Nov. 16, 2016

(Continued)

*Primary Examiner* — Brian M O'Hara
*Assistant Examiner* — Michael B. Kreiner
(74) *Attorney, Agent, or Firm* — McGarry Bair PC

(57) ABSTRACT

A power source for an aircraft including a solid oxide fuel cell and a proton exchange membrane fuel cell along with a solid oxide fuel cell multi-power source. At least one battery is electrically coupled to the solid oxide fuel cell, the proton exchange membrane fuel cell, and an aircraft distribution network to supply electricity to the aircraft and also for becoming recharged by the solid oxide fuel cell and the proton exchange membrane fuel cell.

19 Claims, 5 Drawing Sheets

(56) References Cited

U.S. PATENT DOCUMENTS

| | | | | |
|---|---|---|---|---|
| 2004/0124308 A1* | 7/2004 | Daggett | ............... | B64D 41/00 |
| | | | | 244/58 |
| 2010/0193629 A1* | 8/2010 | Breit | .................... | B64D 11/02 |
| | | | | 244/58 |
| 2016/0090189 A1* | 3/2016 | Wangemann | ........ | H02P 25/184 |
| | | | | 60/698 |
| 2017/0203850 A1* | 7/2017 | Wang | ................... | B64C 39/024 |

OTHER PUBLICATIONS

Halsey, C.J., et al., Taxi vehicle for moving an aircraft, GE co-pending Application No. 16194029, filed on Nov. 16, 2016
Combined Search and Examination Report issued in connection with corresponding GB Application No. 1619401.1 dated May 3, 2017

\* cited by examiner

10,814,992 B2

POWER SOURCE FOR AN AIRCRAFT

BACKGROUND OF THE INVENTION

The electrical power on a jet aircraft is usually provided from the generator(s) on the jet turbine engines and batteries, and in special cases, the Auxiliary Power Unit (APU) or during a power interruption, when all other power sources have failed, the Ram Air Turbine (RAT). A mix of pneumatic, hydraulic, and electrical power is provided through generator(s), a hydraulic pump and compressor in the jet turbine engines or APU system.

In conventional aircraft, electric, hydraulic, and pneumatic power outputs are all dependent on the efficiency and capabilities of the jet turbine engines and APU system. Other forms of harnessing electrical, hydraulic, and pneumatic energy could improve the efficiency of the overall system in an aircraft.

A proton exchange membrane fuel cell (PEMFC) and a solid oxide fuel cell (SOFC) provide direct current (DC) electrical power from a chemical process. SOFC-GT is a SOFC/gas turbine engine hybrid where the unreacted byproducts from the SOFC such as oxygen and hydrogen can be utilized to condition the air used by the SOFC and increase the efficiency of the entire system to which it is electrically coupled.

BRIEF DESCRIPTION OF THE INVENTION

In one aspect of the present disclosure, a power source for an aircraft comprising a solid oxide fuel cell electrically coupled to a first power converter wherein the first power converter is electrically coupled to an aircraft distribution network to supply electricity to the aircraft, a proton exchange membrane fuel cell electrically coupled to a second power converter wherein the second power converter is electrically coupled to the aircraft distribution network to supply electricity to the aircraft, at least one battery electrically coupled to the solid oxide fuel cell, the proton exchange membrane fuel cell, and the aircraft distribution network to supply electricity to the aircraft and to be recharged by the solid oxide fuel cell and the proton exchange membrane fuel cell, and a solid oxide fuel cell multi-power unit electrically coupled to a third power converter wherein the solid oxide fuel cell multi-power unit is electrically coupled to the aircraft distribution network to supply electricity to the aircraft, to supply hydraulics to the aircraft, and to supply compressed air to the aircraft.

In another aspect of the present disclosure, an aircraft comprising a propulsion source, an aircraft distribution network, and a separate power source, the separate power source having a solid oxide fuel cell electrically coupled to a first power converter wherein the first power converter is electrically coupled to the aircraft distribution network to supply electricity to the aircraft. A proton exchange membrane fuel cell electrically coupled to a second power converter wherein the second power converter is electrically coupled to the aircraft distribution network to supply electricity to the aircraft. At least one battery electrically coupled to the solid oxide fuel cell, the proton exchange membrane fuel cell, and the aircraft distribution network to supply electricity to the aircraft and to be recharged by the solid oxide fuel cell and the proton exchange membrane fuel cell. And a solid oxide fuel cell multi-power unit electrically coupled to a third power converter wherein the solid oxide fuel cell multi-power unit is electrically coupled to the aircraft distribution network to supply electricity to the aircraft, to supply hydraulics to the aircraft, and to supply compressed air to the aircraft.

DESCRIPTION OF EMBODIMENTS OF THE INVENTION

Figure 1:
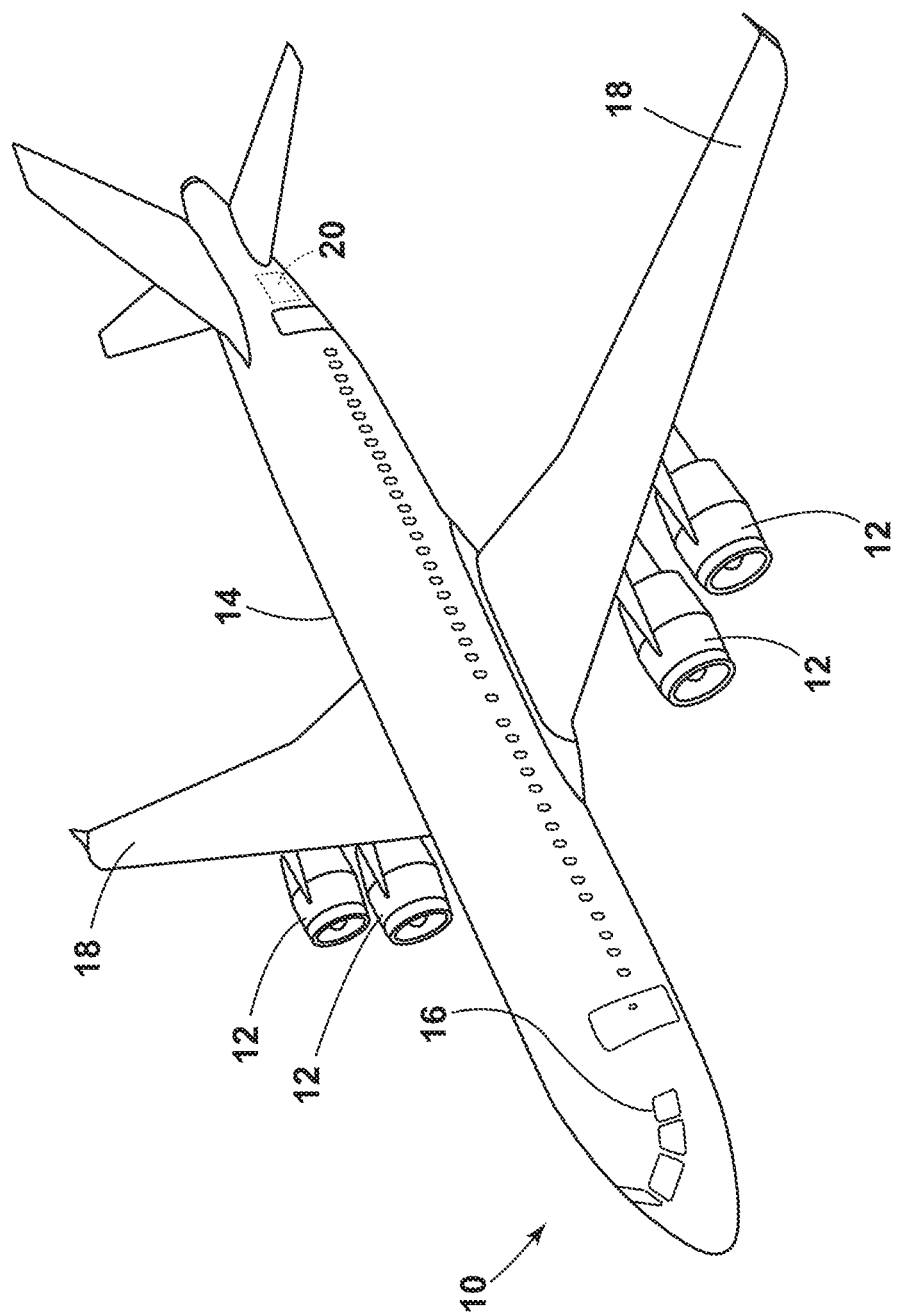
FIG. 1 is a perspective view of an aircraft having an autonomous power system in accordance with various aspects described herein.

FIG. 1 illustrates an embodiment of the disclosure, showing an aircraft 10 that includes an autonomous power source 20, schematically illustrated. It should be understood that while the power source 20 described herein is by way of a non-limiting example in the context of an aircraft, power sources 20 are used in other industries such as marine and automotive industries.

The aircraft 10 can include multiple engines, including turbine engines 12 which by way of non-limiting example can be turbojet engines, turbofan engines, or turboprop engines. Other turbine engines can be included in the power source 20 and will be discussed further in FIG. 2. It should be understood that the turbine engine 12 is a propulsion source and the power source 20 is separate and distinct from the turbine engine 12. The aircraft can also include a fuselage 14, a cockpit 16 positioned in the fuselage 14, and wing assemblies 18 extending outward from the fuselage 14.

While a commercial aircraft 10 has been illustrated, it is contemplated that embodiments of the invention can be used in any type of aircraft 10. Further, while two turbine engines 12 have been illustrated on the wing assemblies 18, it will be understood that any number of turbine engines 12 including a single turbine engine 12 on the wing assemblies 18, or even a single turbine engine mounted in the fuselage 14 can be included.

Figure 2:
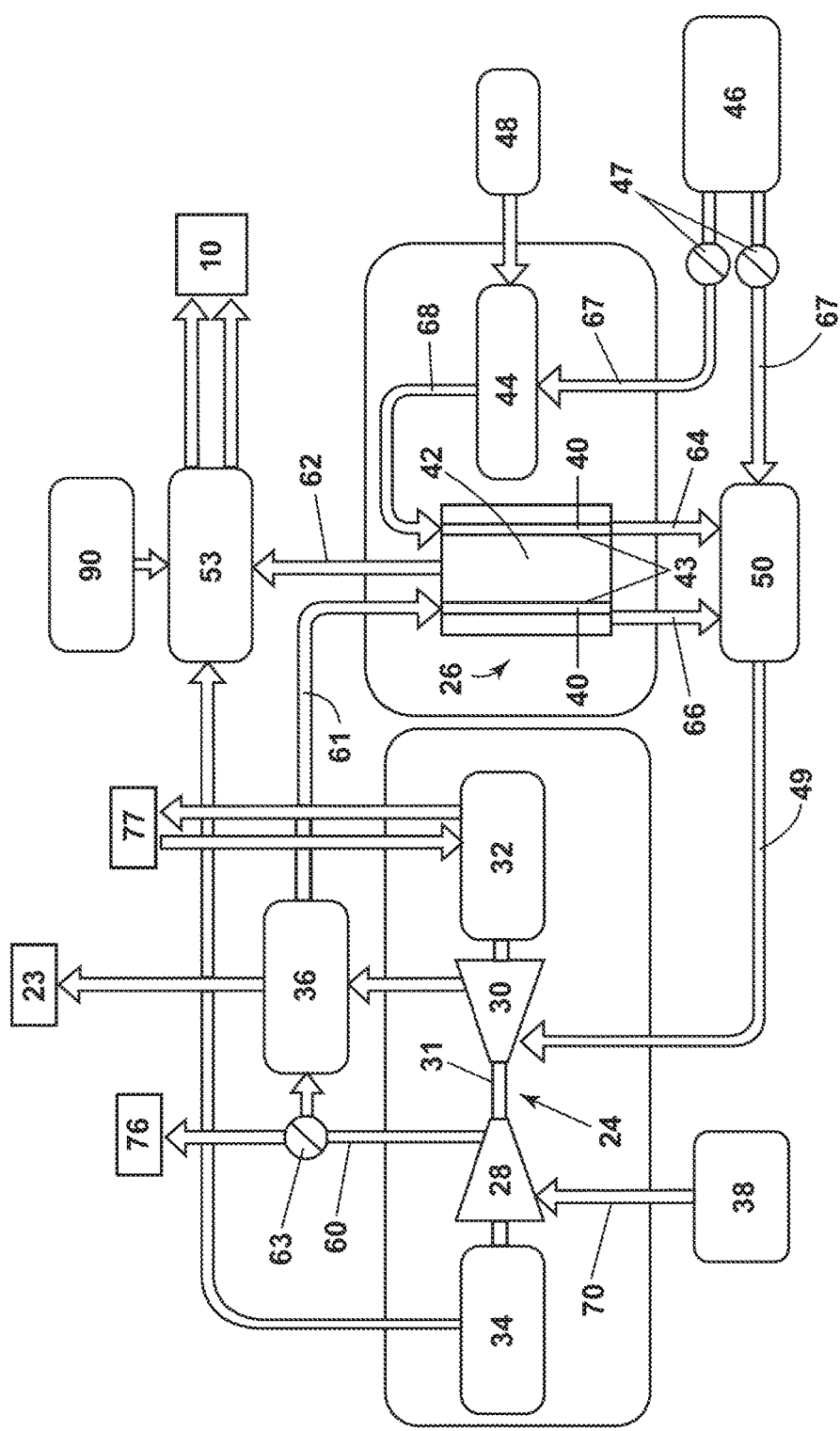
FIG. 2 is a schematic of a solid oxide fuel cell multi-power unit in accordance with various aspects described herein.

FIG. 2 illustrates a solid oxide fuel cell multi-power unit (SOFC-MPU) 22 which by way of non-limiting example is a solid oxide fuel cell gas turbine (SOFC-GT) comprising a turbine 24, a solid oxide fuel cell (SOFC) 26 and an exhaust 23. Alternatively, the SOFC-MPU may comprise an SOFC and one or more electrically powered hydraulic or pneumatic pumps. In the example of the (SOFC-MPU) 22, the turbine 24 includes a compressor 28 and a turbine section 30 connected by an output shaft 31 which is further fluidly coupled by way of a non-limiting example to a hydraulic pump 32 and a motor generator 34. Other auxiliary systems can also be contemplated such as air conditioning, oil cooling, fuel pumping or the like. The turbine is further fluidly coupled to a heat exchanger 36 that is fluidly coupled to an air source 38 and the exhaust 23.

The SOFC 26 consists of two electrodes 40 with an electrolyte 42 in between which together form a power output 62. Each electrode 40 is a thin porous electron conductor, the electrode having a porosity that enables gas to diffuse from the electrodes 40 outer surface to an electrode/electrolyte interface 43. The electrolyte 42 in an SOFC enables the movement of oxidant ions to the fuel and is a fully dense oxygen ion conductor. The full density prevents the gaseous fuel from contacting with air and burning. The most commonly used electrolyte is a ceramic material Zirconium stabilized with Yttrium oxide. It is understood that other electrolytes can be contemplated and Zirconium is a non-limiting example.

The SOFC 26 is made of any appropriate solid material and can be formed in rolled tubes. The SOFC 26 requires high operating temperatures (800-1000° C.) and can be run on a variety of light hydrocarbon fuels including by way of non-limiting example natural gas.

The SOFC 26 is fluidly coupled to a pre-reformer 44. The pre-reformer 44 can be added to condition fuel 67 from a fuel source 46 into a light hydrocarbon fuel 68 for use directly by the SOFC 26. The pre-reformer 44 is fluidly coupled to a source of water 48 to enable the conditioning process. Fuel provided by the fuel source 46 is controlled by a set of valves 47.

A combustor 50 is fluidly coupled to the turbine 24, the SOFC 26, and to the fuel source 46. Combusted fuel 49 is provided to the turbine section 30 of the turbine 24. Additionally, all electrical generating devices are fed into a power converter 53 to output aircraft 10 quality electrical supplies both as 3Ø AC or DC as required.

In order to start the SOFC-MPU 22, the SOFC 26 and the optional pre-reformer 44, if present, must be pre-heated, by way of non-limiting example using an external electrical component, to close to their operating temperatures, after which the motor generator 34 drives the output shaft 31 creating compressed air 60 for the SOFC 26. The compressed air 60 along with light hydrocarbon fuel 68 that has been processed by the pre-reformer 44 react in the SOFC 26 to generate electricity at the power output 62.

Power supplied by the output shaft 30 is governed primarily by the supply of fuel 64, 67 and is therefore variable. SOFC exhaust 64 and additional fuel 67 can be supplied to be burnt in the combustor 50 to increase power available to the output shaft 30. This in turn increases the power available from the output shaft 30 driven devices, for example the hydraulic pump 32 and the starter generator 34.

The SOFC 26 produces byproducts including unreacted fuel 64 and air 66, which are provided to the combustor 50 to power the compressor 28. Mixing fuel 67 and air 66 in the combustor along with recycling the unreacted fuel 64 from the SOFC 26 increases efficiency of the turbine 24.

Air 70 is provided to the compressor 28 where it becomes heated during compression in the compressor 28. The compressed air 60 is controlled, by for example a valve 63, and supplied to the heat exchanger 36 and supplied as heated compressed air 61 to the SOFC and supplied as pneumatic power 76 to the aircraft 10. Hydraulic power 77 is directly supplied by the hydraulic pump 32 to supply hydraulic power 77 to the aircraft 10.

SOFC-GTs 22 have been evaluated as capable of achieving higher operating efficiencies by running the SOFC 26 under pressure. SOFC-GTs 22 typically include anodic and/or cathodic atmosphere recirculation, thus increasing efficiency.

The combination of the SOFC 26 and the gas turbine 24 can result in high overall, electrical and thermal, efficiency. Another feature of the SOFC 26 is on the gain of high percentage CO capturing at comparable high energy efficiency levels. Additional features such as zero CO emission and higher energy efficiency make the SOFC-GT 22 an advantageous part of the power source 20 of the aircraft 10.

Figure 3:
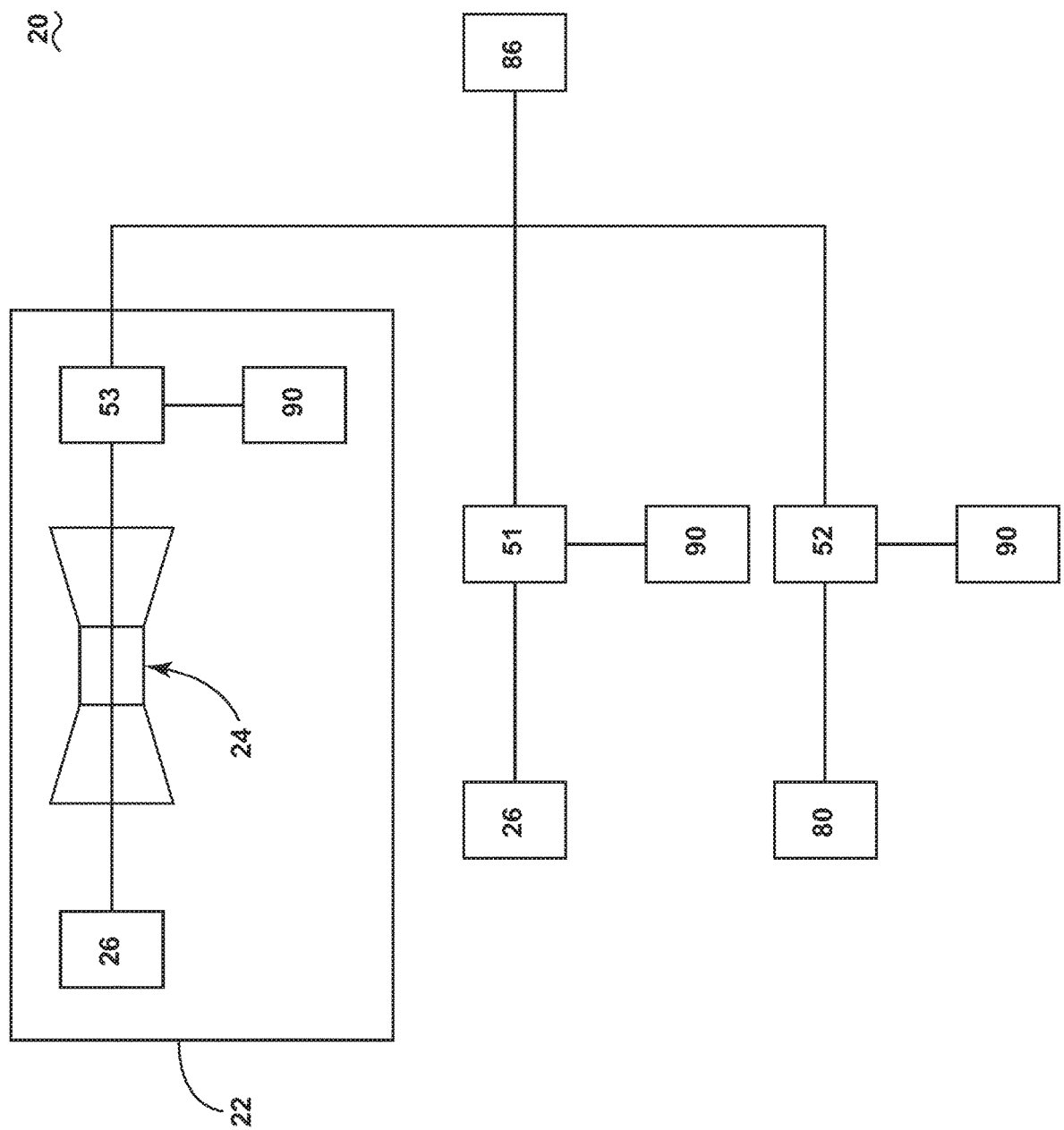
FIG. 3 is a general schematic layout of a power source in accordance with various aspects described herein.

Generally as illustrated in FIG. 3 the power source 20 is a system consisting of four main parts, the SOFC-MPU 22, at least one additional SOFC 26, and at least one additional PEMFC 80 all of which are electrically coupled to an aircraft distribution network 86. The SOFC 26 is electrically coupled to a first power converter 51, the PEMFC 80 is electrically coupled to a second power converter 52, and the SOFC-MPU 22 includes a third power converter 53. A battery supply 90 can also be part of each of the SOFC-MPU 22, the SOFC 26, and the PEMFC 80 in order to be charged and be available as an extra source of power in the event of a power interruption.

Figure 4:
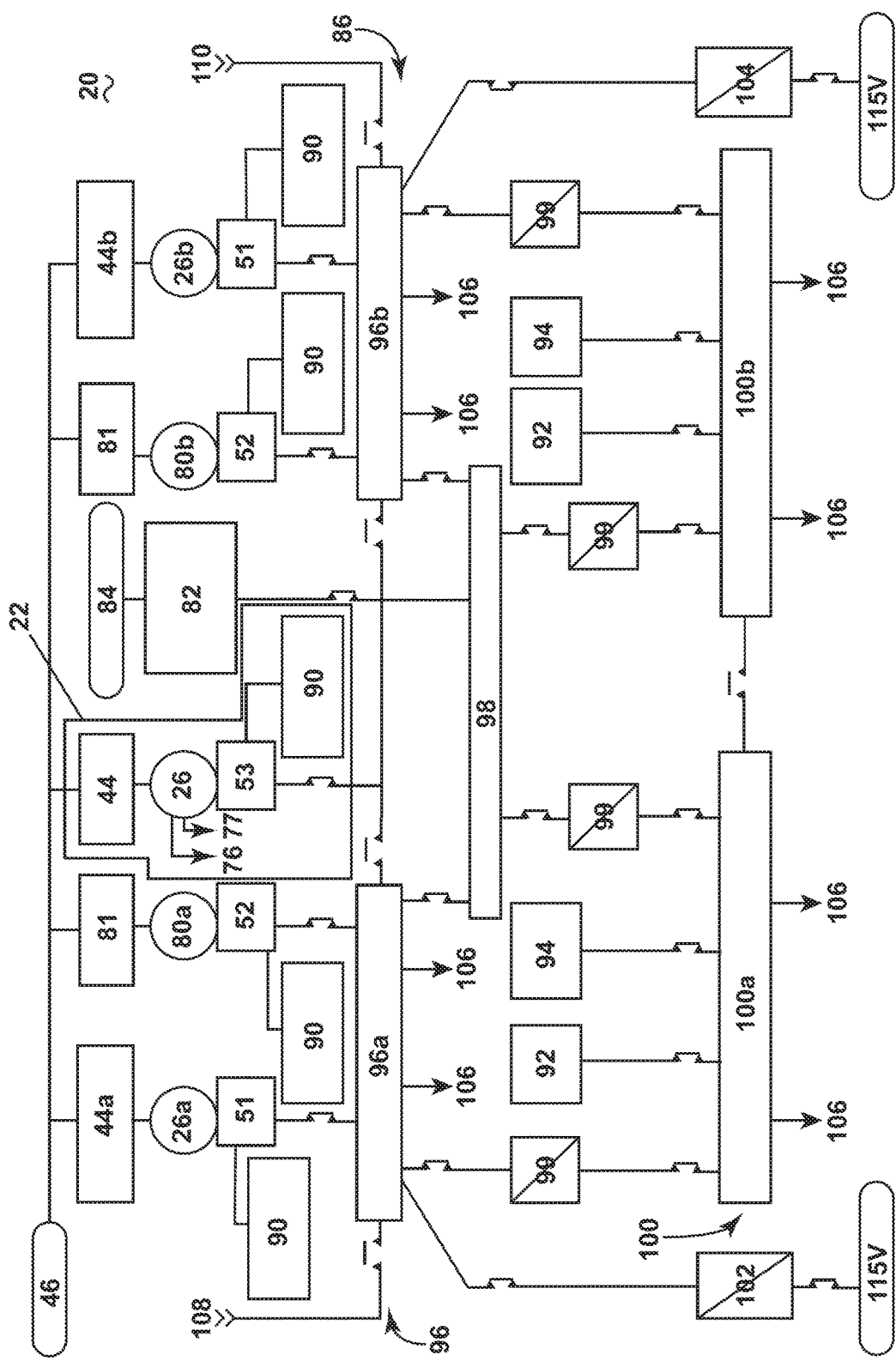
FIG. 4 is an architectural layout of the power source of FIG. 3 in accordance with various aspects described herein.

Turning to FIG. 4 the power source 20 is illustrated in more detail as an aircraft architecture layout. In this architecture, the SOFC-GT 22 is fluidly coupled to the fuel source 46. The fuel source 46 stores aviation fuel for use in different areas of the aircraft 10. Additional components of the architecture include two independent SOFCs 26a, 26b and two independent proton exchange membrane fuel cells (PEMFC) 80a, 80b also fluidly coupled to the fuel source 46. A supplemental power PEMFC 82 is fluidly coupled to an independent fuel source 84 for supplemental power. Supplemental power may be required during a power interruption, which could include a complete power interruption or a momentary power interruption. The SOFC-GT 22, SOFCs 26a, 26b, PEMFCs 80a, 80b, and the supplemental power PEMFC 82 are all electrically coupled to the aircraft distribution network 86.

The PEMFCs 80a, 80b are another type of fuel cell similar to the SOFC, but capable of operating at lower temperature (50 to 100° C.) and pressure ranges. The PEMFC requires a hydrogen fuel and an oxygen input as well. Hydrogen is provided through fuel reformers 81 fluidly coupled to each independent PEMFC 80a, 80b. Each PEMFC 80a, 80b is electrically coupled to the second power converter 52, which by way of non-limiting example is a direct current (DC) to direct current (DC) converter used to provide a voltage output to the required aerospace power quality. The required aerospace power quality is a standard, by non-limiting example the MIL-STD-704, that defines a standardized power interface for aircraft to ensure that the electrical system includes components that are all electrically compatible in areas including nominal/max/min voltage, frequency, ripple, noise, and transient peaks and times.

Each independent SOFC 26a, 26b is similar in make-up and function to the SOFC 26. An electrical output is generated by the independent SOFCs 26a, 26b. Each SOFC 26a, 26b is electrically coupled to an additional power converter 52, which by way of non-limiting example is a direct current (DC) to direct current (DC) converter used to provide a voltage output to the required aerospace quality. Additionally, each SOFC 26a, 26b is fluidly coupled to a pre-reformer 44a, 44b, similar in make-up and function to the pre-reformer 44.

Battery supplies 90, which by way of a non-limiting example can be batteries 92 or supercapacitors 94 or a combination of both, can be electrically coupled to the SOFCs 26a, 26b and the PEMFCs 80a, 80b to supply additional electricity to the aircraft 10. Supercapacitors 94 can be used in powering fast load transients that can occur. It is also contemplated that the battery supplies 90 are recharged by the SOFCs 26a, 26b and the PEMFCs 80a, 80b respectively. The supercapacitors 94 complement the batteries 92 as they can accept and deliver charge much faster than batteries. However they cannot replace batteries because for a given amount of charge they will be larger and heavier. The battery supplies 90 would be located in a controlled environment with other electrical components.

The aircraft distribution network 86 includes a set of high voltage buses 96, an supplemental bus 98, and a set of low voltage buses 100. The supplemental bus 98 is directly electrically coupled to the set of high voltage buses 96 and electrically coupled via a DC to DC converter 99 to the set of low voltage buses 100 to provide data and signal storage during a power interruption, which could be a complete interruption or a momentary interruption state.

The set of high voltage buses 96 can be a left high voltage bus 96a and a right high voltage bus 96b configured to generate an output to a left converter 102 and a right converter 104 respectively. Each of the left and right converters 102, 104 can be by way of a non-limiting example a DC to alternating current (AC) converter configured to produce an output of 115V AC.

The set of low voltage buses 100 can be a left low voltage bus 100a and a right low voltage bus 100b each electrically coupled to their respective high voltage buses 96a, 96b by additional DC to DC converters 99 capable of converting a voltage from, by way of non-limiting example, 270V to 28V. The set of low voltage buses 100 is further configured to charge or receive electricity from a super capacitor and a battery. The set of high voltage and low voltage buses 96, 100 are electrically coupled to a variety of different loads 106.

Additionally ground power cart inputs 108 and 110 are provided for a source of electrical power while the aircraft 10 is on the ground, typically at the gate in an airport.

Figure 5:
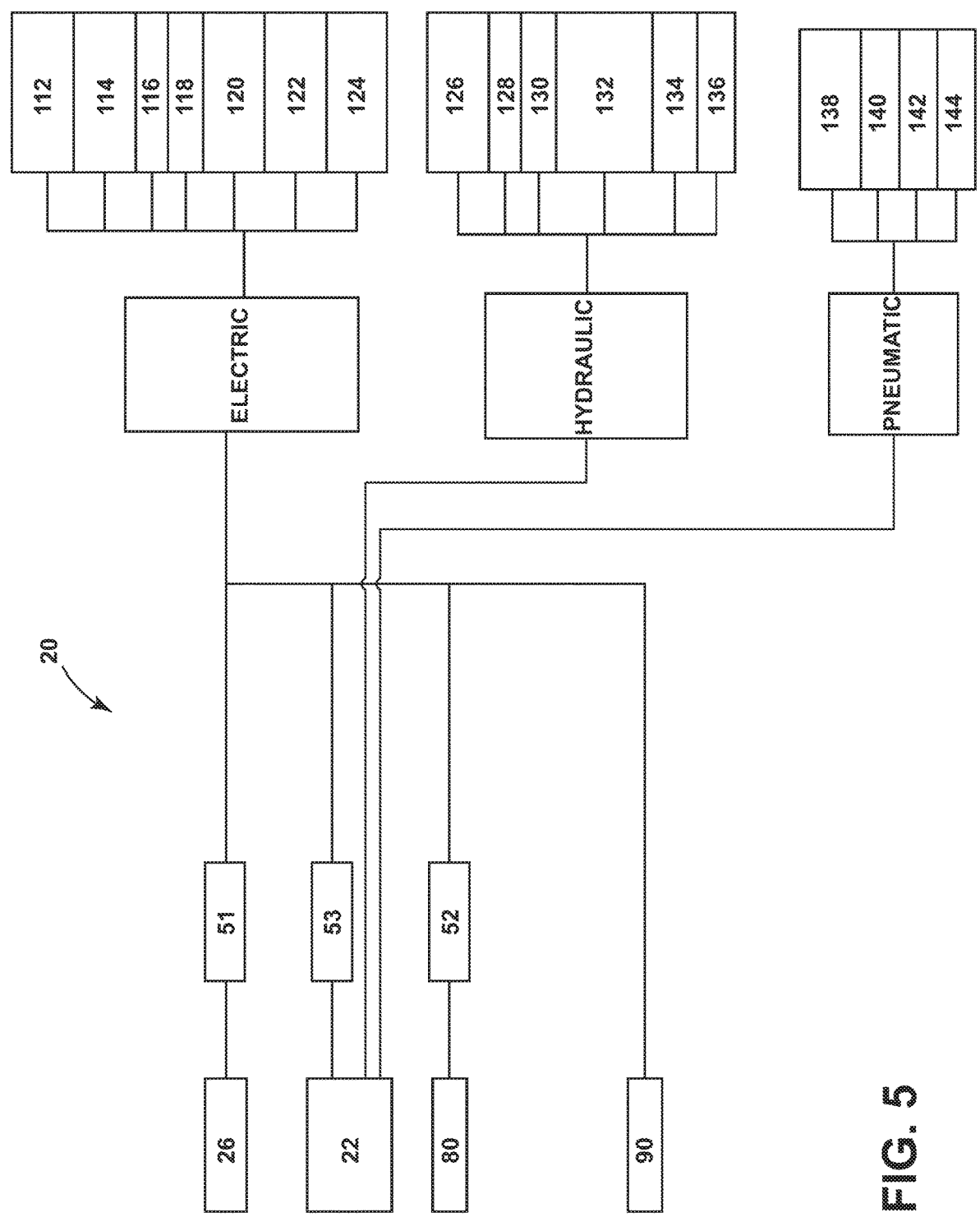
FIG. 5 is a diagram of load distributions for the power source of FIG. 3 in accordance with various aspect described herein.

Turning now to FIG. 5 a diagram of the loads 106 electrically coupled to individual components of the power source 20 is illustrated. Each independent SOFC 26a, 26b, the SOFC-GT 22, the PEMFCs 80a, 80b, and any additional batteries 92 generate electricity that is provided to all electrical systems in the aircraft 10 including by way of non-limiting example, auxiliary hydraulic pumps 112, fuel boost pumps 114, lighting 116, avionics 118, ice and rain protection 120, commercial loads 122, and cargo holding 124.

The SOFC-GT 22 provides the pneumatic and hydraulic power 76, 77 for the respective pneumatic and hydraulic loads. The hydraulic loads include by way of non-limiting example flight controls 126, landing gear 128, brakes 130, backup hydraulic generator 132, cargo doors 134, and thrust reverse 136. The pneumatic loads include by way of non-limiting example air conditioning 138, pressurization 140, wing anti-ice 142, and water systems 144.

In this way the aircraft turbine engine 12 is utilized only to provide propulsion while all other load demands are provided by the power source 20 discussed herein. A controller (not shown) is electrically coupled to each of the SOFCs 26, the PEMFCs 80, the SOFC-GT 22 and to at least one of the aforementioned batteries 92 to manage the loads placed on the SOFCs 26, the PEMFCs 80, the SOFC-GT 22, and the at least one battery 92. In this manner, the controller can designate electricity to areas of the aircraft 10 requiring electrical power when other areas are not needing electrical power. In a non-limiting example, the ice and rain protection 120 can have power allocated for applying ice and rain protections to the wing assemblies 18 while power to the cargo loading 124 area is temporarily stopped.

Benefits to allocating all electrical loads to the power source 20, separate from the turbine engine 12, include removing the amount of variability of output load placed on the turbine engine 12 thus stall margins are improved, high electrical demand is removed during take-off when maximum thrust is required thereby allowing engine 12 to be designed for optimum propulsion.

Additionally, the thrust and fuel efficiency of the turbine engine 12 is improved because electrical, pneumatic, and hydraulic extraction have all been removed. Conventional systems have poor efficiencies on the ground while the power source 20 described herein has an improved efficiency by coupling an SOFC with a PEMFC power source which also decreases CO emissions along with other pollution including noise. The power source 20 is therefore environmentally cleaner than conventional turbine engines in particular when on the ground at airports.

The availability of the aircraft electrical system is also improved. Any loss of an engine or engines, does not affect electrical power system. The modular design of the system offers high availability as well. An intelligent power management system can be implemented to match the load demands against the dynamic availability of power such that a portion of the system can be turned off reduce the peak load of the system at that time. The intelligent power management system enables the power system to generate power efficiently to all areas requiring power at appropriate times.

Maintenance requirements would no longer include having to service the electrical system through the turbine engine 12, which allows for quicker turn-around time and more effective replacement and fixing of parts.

Finally, aircraft drag and vibration are reduced when using supplemental power, since an supplemental power source is implemented in the power source 20 without adding a supplemental ram air turbine (RAT) that can increase drag and vibration.

To the extent not already described, the different features and structures of the various embodiments can be used in combination with each other as desired. That one feature cannot be illustrated in all of the embodiments is not meant to be construed that it cannot be, but is done for brevity of description. Thus, the various features of the different embodiments can be mixed and matched as desired to form new embodiments, whether or not the new embodiments are expressly described. Moreover, while "a set of" various elements have been described, it will be understood that "a set" can include any number of the respective elements, including only one element. Combinations or permutations of features described herein are covered by this disclosure.

This written description uses examples to disclose embodiments of the invention, including the best mode, and also to enable any person skilled in the art to practice embodiments of the invention, including making and using any devices or systems and performing any incorporated methods. The patentable scope of the invention is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A power source for an aircraft comprising:
   a solid oxide fuel cell electrically coupled to a first power converter wherein the first power converter is electrically coupled to an aircraft distribution network to supply electricity to the aircraft;
   a proton exchange membrane fuel cell electrically coupled to a second power converter wherein the second power converter is electrically coupled to the aircraft distribution network to supply electricity to the aircraft;

at least one battery electrically coupled to the solid oxide fuel cell, the proton exchange membrane fuel cell, and the aircraft distribution network to supply electricity to the aircraft and to be recharged by the solid oxide fuel cell and the proton exchange membrane fuel cell; and a solid oxide fuel cell multi-power unit electrically coupled to a third power converter wherein the solid oxide fuel cell multi-power unit is electrically coupled to the aircraft distribution network to supply electricity to the aircraft, to supply hydraulics to the aircraft, and to supply compressed air to the aircraft.

2. The power source of claim 1 wherein the solid oxide fuel cell, the proton exchange membrane fuel cell, and the solid oxide fuel cell multi-power unit are fluidly coupled to a fuel source.

3. The power source of claim 2 where the fuel source is at least one source of aviation fuel.

4. The power source of claim 3 further comprising at least one reformer between the fuel source and at least one of the solid oxide fuel cell, the proton exchange membrane fuel cell, and the solid oxide fuel cell multi-power unit.

5. The power source of claim 1 wherein solid oxide fuel cell multi-power unit comprises a solid oxide fuel cell electrically coupled to an electrically powered compressor and an electrically powered hydraulic pump.

6. The power source of claim 1 wherein solid oxide fuel cell multi-power unit comprises a solid oxide fuel cell fluidly coupled to a gas turbine engine.

7. The power source of claim 1 further comprising supercapacitors electrically coupled the at least one battery to power fast load transients.

8. The power source of claim 1 further comprising an independent fuel source electrically coupled to a second proton exchange membrane fuel cell for supplemental power.

9. The power source of claim 1 further comprising a controller in the aircraft distribution network electrically coupled to each of the solid oxide fuel cell, the proton exchange membrane fuel cell, the solid oxide fuel cell multi-power unit, and the at least one battery to control allocation of electricity from the solid oxide fuel cell, the proton exchange membrane fuel cell, the solid oxide fuel cell multi-power unit, and the at least one battery on the aircraft distribution network.

10. The power source of claim 1 wherein at least one of the first power converter, the second power converter, or the solid oxide fuel cell combined with third power converter is configured to convert DC power to AC power.

11. An aircraft comprising:
a propulsion source;
an aircraft distribution network; and
a separate power source, the separate power source having
a solid oxide fuel cell electrically coupled to a first power converter wherein the first power converter is electrically coupled to the aircraft distribution network to supply electricity to the aircraft;

a proton exchange membrane fuel cell electrically coupled to a second power converter wherein the second power converter is electrically coupled to the aircraft distribution network to supply electricity to the aircraft;

at least one battery electrically coupled to the solid oxide fuel cell, the proton exchange membrane fuel cell, and the aircraft distribution network to supply electricity to the aircraft and to be recharged by the solid oxide fuel cell and the proton exchange membrane fuel cell; and a solid oxide fuel cell multi-power unit electrically coupled to a third power converter wherein the solid oxide fuel cell multi-power unit is electrically coupled to the aircraft distribution network to supply electricity to the aircraft, to supply hydraulics to the aircraft, and to supply compressed air to the aircraft.

12. The aircraft of claim 11 wherein the solid oxide fuel cell, the proton exchange membrane fuel cell, and the solid oxide fuel cell multi-power unit are fluidly coupled to a fuel source.

13. The aircraft of claim 12 further comprising at least one reformer between the fuel source and at least one of the solid oxide fuel cell, the proton exchange membrane fuel cell, and the solid oxide fuel cell multi-power unit.

14. The aircraft of claim 11 wherein the solid oxide fuel cell multi-power unit comprises a solid oxide fuel cell electrically coupled to an electrically powered compressor and an electrically powered hydraulic pump.

15. The aircraft of claim 11 wherein the solid oxide fuel cell multi-power unit comprises a solid oxide fuel cell fluidly coupled to a gas turbine engine.

16. The aircraft of claim 11 further comprising supercapacitors electrically coupled the at least one battery to power fast load transients.

17. The aircraft of claim 11 further comprising an independent fuel source fluidly coupled to a second proton exchange membrane fuel cell for supplemental power.

18. The aircraft of claim 11 further comprising a controller in the aircraft distribution network electrically coupled to each of the solid oxide fuel cell, the proton exchange membrane fuel cell, the solid oxide fuel cell multi-power unit, and the at least one battery to control allocation of electricity from the solid oxide fuel cell, the proton exchange membrane fuel cell, the solid oxide fuel cell multi-power unit, and the at least one battery on the aircraft distribution network.

19. The aircraft of claim 11 wherein at least one of the first power converter, the second power converter, or the solid oxide fuel cell combined with third power converter is configured to convert DC power to AC power.

* * * * *